UNITED STATES PATENT OFFICE.

HARRY BREARLEY AND FRANCIS COLIN MOORWOOD, OF SHEFFIELD, ENGLAND.

MANUFACTURE OF SILICA BRICKS, GANISTER, AND OTHER REFRACTORY MATERIALS.

958,084. Specification of Letters Patent. Patented May 17, 1910.

No Drawing. Application filed March 22, 1909. Serial No. 485,091.

*To all whom it may concern:*

Be it known that we, HARRY BREARLEY, metallurgist, and FRANCIS COLIN MOORWOOD, steel manufacturer, subjects of the King of Great Britain, residing, respectively, at 51 Millhouses Lane and at Whirlowdale Road, both of Sheffield, Yorkshire, England, have invented new and useful Improvements in the Manufacture of Silica Bricks, Ganister, and other Refractory Materials, of which the following is a specification.

In the manufacture of acid refractory materials it is usual to add lime as oxid or hydrate in the form of an intimate mixture with water to act during the subsequent burning as a binding material or flux. By this means the lime accumulates more in one part of the refractory material than in another, and consequently such material does not possess throughout uniformly refractory properties, and in use honeycombs or breaks down through local fusion.

According to this invention in order to wholly or partially replace the lime usually used there is added to the silica an aqueous solution of a salt of calcium which will when the mixture (as a brick or ganister or other form in which an acid refractory material is commonly used) is burned deposit lime. Preferably the soluble salt is added as such but it might be prepared *in situ* by adding lime and a suitable acid. A chlorid is a suitable salt to use, and the amount added should be such that the mixture contains its usual quantity of lime say up to three per cent. The mixture is burned as usual and lime will be deposited uniformly throughout the mass. Bricks or other articles made in this manner are not subject to local fusions and are mechanically stronger than bricks made with insoluble bonds.

We are aware that mixtures of calcium chlorid and sodium silicate have already been applied to brick making, but these two substances, even in dilute solutions, mutually decompose each other with formation of calcium silicate in the insoluble form. This however is not a soluble bond, and does not decompose during the burning of the bricks in the manner required. We are also aware that calcium hydrate or calcium sulfate and water have been proposed as a bond for silica and that such compounds are soluble to some small extent, we however use the term "a calcium substance soluble in water" as including only the more soluble calcium substances *i. e.* substances comparable in solubility to the chlorid.

What we claim is:—

1. The process of manufacturing acid refractory material possessing throughout uniformly refractory properties, which consists in burning a mixture made by adding to silica, water and a calcium-containing substance soluble in water and capable of depositing lime when heated in sufficient quantity to produce the requisite silicatization.

2. The process of manufacturing acid refractory material composed only of silica and lime and possessing throughout uniformly refractory properties, which consists in burning a mixture composed of silica, water and a substantially soluble compound of calcium capable of depositing lime when heated in sufficient quantity to produce the requisite silicatization.

3. The process of manufacturing acid refractory material composed only of silica and lime, which consists in burning a mixture composed of silica, water and calcium chlorid.

HARRY BREARLEY.
FRANCIS COLIN MOORWOOD.

Witnesses:
 LUTHER J. PARR,
 CHAS. N. DANIELS.